United States Patent
Yamashita

(10) Patent No.: US 8,284,315 B2
(45) Date of Patent: Oct. 9, 2012

(54) PAL SIGNAL DEMODULATING APPARATUS

(75) Inventor: Kenji Yamashita, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1048 days.

(21) Appl. No.: 12/132,963

(22) Filed: Jun. 4, 2008

(65) Prior Publication Data

US 2008/0297659 A1    Dec. 4, 2008

(30) Foreign Application Priority Data

Jun. 4, 2007   (JP) .................................. 2007-148162

(51) Int. Cl.
    *H04N 9/66*    (2006.01)
(52) U.S. Cl. ........ 348/640; 348/441; 348/509; 348/555; 348/473; 348/488
(58) Field of Classification Search .......... 348/441–449, 348/509, 555, 559, 640; 386/232
    See application file for complete search history.

(56) References Cited

U.S. PATENT DOCUMENTS

| 4,766,484 A | 8/1988 | Clayton et al. | |
| 5,345,311 A * | 9/1994 | Adach | 348/640 |
| 7,274,408 B2 * | 9/2007 | Shan et al. | 348/669 |
| 2005/0270426 A1 * | 12/2005 | Wu et al. | 348/638 |

FOREIGN PATENT DOCUMENTS

| JP | 50-29289 | 9/1975 |
| JP | 8-018997 | 1/1996 |
| JP | 2002-58043 | 2/2002 |
| JP | 2005-277562 | 10/2005 |

OTHER PUBLICATIONS

Notice of Reasons for Rejection mailed May 2, 2012 by the Japanese Patent Office in corresponding Japanese Patent Application No. 2007-148162, 5 pages.
Translation of the Notification of Examination Opinion mailed May 25, 2012 by the Taiwanese Patent Office in corresponding Patent Application No. 097119079, 19 pages.

* cited by examiner

*Primary Examiner* — Pankaj Kumar
*Assistant Examiner* — Alazar Tilahun
(74) *Attorney, Agent, or Firm* — Young & Thompson

(57) ABSTRACT

A PAL signal demodulating apparatus comprises BPF filters that perform band pass filtering to pass a chroma band for frames 1 to 5, thereby producing the BPF output signals for the frames, a 3D color phase distortion correcting color signal acquiring unit that calculates correlations between frames 1 and 3 and between frames 3 and 5 and takes a weighted average of the BPF output signals for frames 2 and 4 with weights according to the two calculated correlations, thereby producing a 3D color phase distortion correcting color signal N, and a carrier chrominance signal extracting unit that takes the addition/subtraction of the BPF output signal for frame 3 and the 3D color phase distortion correcting color signal, thereby extracting carrier chrominance signals, to perform correctly U/V separation for a line different in color from its preceding and following lines in the same frame.

16 Claims, 13 Drawing Sheets

PAL SIGNAL DEMODULATING APPARATUS

BACKGROUND OF THE INVENTION

1. Field of the Invention

The present invention relates to a technique for demodulating a composite signal of a PAL (Phase Alternating Line) system and particularly to a technique for extracting a carrier chrominance signal from the composite signal of the PAL system.

2. Description of Related Art

The PAL system is known as one of video systems using a composite signal. In the PAL system, by quadrature two-phase modulating a color subcarrier with two chrominance signals (U and V signals), a carrier color signal (C signal) is produced and then transmitted. In order to correct for phase distortion inflicted during transmission due to transmission distortion or the like, the phase of the color subcarrier for the V signal is 180° inverted on a per line basis to produce the color signal C. Further, in order to prevent interference between lines, the frequency of the color subcarrier is selected such that the phase of each line is shifted by 90° relative to the previous line, that is, the phase is shifted by 180° every two lines.

Hence, in the composite signal of the PAL system (hereinafter called a PAL signal), as shown in FIG. 10, the phase of the C signal differs by 180° between line (n) and line (n−2) preceding by two lines in the same frame, and the phase of the color subcarrier for the V signal differs by 180° between line (n) and the preceding line (n−1). That is, in the same frame, the phase of the color subcarrier for the V signal is shifted by 180° every line, and the phase of the C signal is shifted by 180° every two lines.

Further, comparing the same lines (n) of different frames in phase, as shown in FIG. 11, the phase of the C signal for line (n) differs by 180° between frame (m) and frame (m−2) preceding by two frames, and the phase of the color subcarrier for the V signal for line (n) differs between frame (m) and the preceding frame (m−1). That is, for the same numbered line, the phase of the color subcarrier for the V signal is shifted by 180° every frame, and the phase of the C signal is shifted by 180° every two frames.

In video apparatuses such as receivers for the PAL signal and video recorders for recording the PAL signal on a record medium, when demodulating the PAL signal, Y/C separation is performed to separate the Y signal and the C signal with correcting the PAL signal for phase distortion. Techniques of Y/C separation include two-dimensional Y/C separation using the characteristic of the PAL signal shown in FIG. 10 and three-dimensional Y/C separation using the characteristic of the PAL signal shown in FIG. 11.

As to the three-dimensional Y/C separation, a method is known which takes the addition/subtraction of the composite signal for a frame of interest and the composite signal for the frame preceding by two frames the frame of interest. For example, for frame (m), Y/C separation is performed by taking the addition/subtraction of the composite signals for frame (m) and frame (m−2), and for frame (m+2), Y/C separation is performed by taking the addition/subtraction of the composite signals for frame (m+2) and frame (m).

With this method, the problem of cross color interference or cross luminance interference (hereinafter simply called cross interference) may occur. Description will be made of an example case where for only frame (m) of five frames (m−2) to (m+2) the C signal differs, that is, only the C signal of frame (m) is irrelevant to the C signals of the other frames. Because Y/C separation for frame (m) is performed by taking the addition/subtraction of the composite signals for frame (m) and frame (m−2), the C signal for frame (m) obtained by Y/C separation has the C signal of irrelevant frame (m−2) mixed therein, which means the occurrence of cross interference. Likewise, because Y/C separation for frame (m+2) is performed by taking the addition/subtraction of the composite signals for frame (m+2) and frame (m), the C signal for frame (m+2) obtained by Y/C separation has the C signal of irrelevant frame (m) mixed therein, which means the occurrence of cross interference.

In the Japanese Unexamined Patent Application Publication No. H08-18997 (hereinafter called reference 1), there is disclosed a technique to solve this problem. In the technique of reference 1, for frame (m) of interest, the preceding frame (m−1), and frame (m−2) preceding by two frames, BPF that passes the band of the C signal is performed to obtain three BPF output signals, and only when there is a correlation between these three BPF output signals, the BPF output signal for frame (m−1) or frame (m−2) selected by a signal selector is subtracted from the BPF output signal for frame (m) of interest, thereby extracting the C signal for frame (m) of interest. In contrast, when there is no correlation between the three BPF output signals, the BPF output signal for frame (m) of interest itself is adopted as the C signal for frame (m) of interest. In this way, cross interference in Y/C separation is avoided.

As to the two-dimensional Y/C separation, a method is known which takes the addition/subtraction of the composite signal for a line of interest and the composite signal for the line preceding by two lines the line of interest. For example, for line (n), Y/C separation is performed by taking the addition/subtraction of the composite signals for line (n) and line (n−2), and for line (n+2), Y/C separation is performed by taking the addition/subtraction of the composite signals for line (n+2) and line (n).

It is thought that the three-dimensional Y/C separation and the two-dimensional Y/C separation are suitable for still images and moving images respectively. In Japanese Unexamined Patent Application Publication No. 2005-277562 (hereinafter called reference 2), there is disclosed a technique in which combined Y/C separation of the two-dimensional Y/C separation and the three-dimensional Y/C separation is performed to suppress degradation in image quality when switching between still images and moving images.

In this technique, the three-dimensional Y/C separation and the two-dimensional Y/C separation are performed on the PAL signal while detecting motion represented in the video signal. The Y signal and C signal separated by the three-dimensional Y/C separation and the Y signal and C signal separated by the two-dimensional Y/C separation are mixed respectively such that as the motion becomes larger, the proportion of the signals obtained by the two-dimensional Y/C separation becomes larger, thereby realizing motion-adaptive Y/C separation.

The U and V signal components are extracted from the C signal obtained by Y/C separation (U/V separation), and color demodulation is performed on the extracted U and V signal components. Hereinafter, in order to distinguish signals before the color demodulation and signals after the color demodulation, the U and V signal components before the color demodulation are called carrier chrominance signals (a carrier U signal or u signal and a carrier V signal or v signal), and the U and V signal components after the color demodulation are simply called chrominance signals (U and V signals).

A method of the U/V separation is known which, utilizing the characteristic of the PAL signal shown in FIG. 10, takes the addition/subtraction of the C signal for a line of interest and the C signal for the line preceding the line of interest in the same frame, thereby separating two carrier chrominance signals for the line of interest.

With this method, there is the problem that, if a color boundary exists at a position in a vertical direction, the color of a line on the color boundary may not be its original color. For example, as shown in FIG. 12, where the color of line (n−2) and line (n−1) is magenta and the color of lines (n) to (n+2) is green, the addition/subtraction of the magenta of line (n−1) and the green of line (n) is taken in extracting carrier chrominance signals for line (n), and hence the carrier chrominance signals extracted for line (n) represent white.

In Japanese Unexamined Patent Application Publication No. 2002-58043 (hereinafter called reference 3), there is disclosed a technique to solve this problem. In this technique, for line (n) of interest and two lines each of before and after it, i.e. lines (n−2), (n−1), (n+1), (n+2), in the same frame, BPF that passes the band of the C signal is performed to obtain five BPF output signals C0, C1, C2, C3, C4, and a correlation between C0 and C2 and a correlation between C2 and C4 are obtained. A weighted average of the C1 and −C3 is taken in such a proportion that if the correlation between C0 and C2 of the two correlations is larger, the proportion of C1 is made larger and that if the correlation between C2 and C4 is larger, the proportion of −C3 is made larger, to obtain a color phase distortion correcting color signal N. Then by taking the addition/subtraction of the BPF output signal C2 for line (n) of interest and the color phase distortion correcting color signal N, carrier chrominance signals for line (n) of interest are separated. Applying this technique to an example frame shown in FIG. 12, since there is no correlation between the BPF output signals for lines (n−2), (n) and there is a correlation between those for lines (n), (n+2), the BPF output signal for lines (n+1) is used as the color phase distortion correcting color signal N. Therefore, the carrier chrominance signals for line (n) separated by taking the addition/subtraction of the BPF output signal for line (n) and the color phase distortion correcting color signal N, represent its original color.

Here the results of applying the U/V separation technique of reference 3 to the frame shown in FIG. 13 will be discussed. In the frame shown in FIG. 13, of line (n) of interest and two lines each of before and after it, i.e. lines (n−2), (n−1), (n+1), (n+2), only line (n) of interest is red in color and the other four lines are blue in color. When applying the U/V separation technique of reference 3 to this frame, the color phase distortion correcting color signal N for line (n) of interest is a weighted average of the BPF output signals for lines (n−1), (n+1) and hence is blue. Thus, the carrier chrominance signals for line (n) of interest U/V-separated by taking the addition/subtraction of the BPF output signal of line (n) of interest and the color phase distortion correcting color signal N, represent a color having blue mixed therein and not its original red. That is, with the U/V separation technique of reference 3, there is the problem that U/V separation cannot be correctly performed for a line of interest which differs in color from the lines before and after it.

The same problem occurs with a technique which performs U/V separation for a line of interest by taking the addition/subtraction of the C signal for the line of interest and the C signal for the preceding line.

Here the case of applying the technique of reference 1 to video shown in FIG. 14 will be discussed. In the example of FIG. 14, in each of frames 1 to 5, only line (n) of interest is red and the other lines are blue. Where Y/C separation is performed for frame 3 by the technique of reference 1, the BPF output signal of frame 2 or 3 is produced as the color phase distortion correcting color signal because there is a color correlation between frames 2, 3, 4, and the C signal for frame 3 is separated. However, in the U/V separation of the C signal obtained in this way, whichever of the above U/V separation techniques is used, the carrier chrominance signals for line (n) of interest in frame 3 represent a color having the color of line (n−1) or (n+1) mixed therein and not its original red. That is, also with the technique of reference 1, there is the problem that U/V separation cannot be correctly performed for a line of interest which differs in color from other lines in the same frame because a color correlation exists between frames on a corresponding line basis.

SUMMARY

According to an aspect of the present invention, there is provided a PAL signal demodulating apparatus which demodulates a composite signal of a PAL (phase alternating line) system. The PAL signal demodulating apparatus comprises a frame carrier color signal extracting unit, a 3D color phase distortion correcting color signal acquiring unit, and a carrier chrominance signal extracting unit.

The frame carrier color signal extracting unit extracts a carrier color signal for a frame (m) of interest.

The 3D color phase distortion correcting color signal acquiring unit generates a 3D color phase distortion correcting color signal for the frame (m) of interest using one or both of a frame (m−1) preceding the frame (m) of interest and a frame (m+1) following the frame (m) of interest.

The carrier chrominance signal extracting unit takes the addition/subtraction of the 3D color phase distortion correcting color signal and the carrier color signal extracted by the frame carrier color signal extracting unit, thereby extracting carrier chrominance signals for the frame (m) of interest.

Further, according to another aspect, the present invention can be embodied as a PAL signal demodulating method or system.

According to the technique of the present invention, U/V separation in PAL signal demodulation can be performed correctly for a line different in color from its preceding and following lines in the same frame.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

Figure 1:
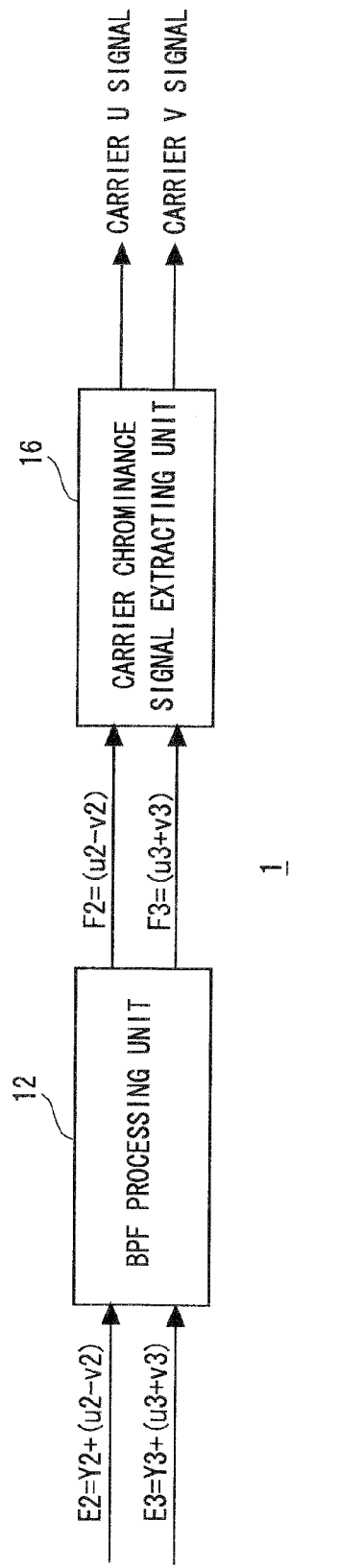
FIG. 1 is a schematic view of a U/V separator 1 for describing a technique according to the present invention.

The invention will now be described herein with reference to illustrative embodiments. Those skilled in the art will recognize that many alternative embodiments can be accomplished using the teachings of the present invention and that the invention is not limited to the embodiments illustrated for explanatory purposes.

In order to make the embodiments of the present invention easy to understand, first the principle of the present invention will be described. In the description below, consecutive five frames are referred to as frames 1, 2, 3, 4, and 5, which are input in that order, and frame 3 is a frame of interest. The composite signals for the frames are denoted by E1 to E5, and it is assumed that they are expressed by the equation (1):

$$E1 = Y1 - (u1 + v1)$$
$$E2 = Y2 + (u2 - v2)$$
$$E3 = Y3 + (u3 + v3) \quad (1)$$
$$E4 = Y4 - (u4 - v4)$$
$$E5 = Y5 - (u5 + v5)$$

where E is a composite signal, Y is a luminance signal, u is a carrier chrominance signal (carrier U signal), and v is a carrier chrominance signal (carrier V signal).

Further, in the description below, band pass filtering (BPF) process is to pass a chroma band and can remove the luminance component from the PAL signal to a certain degree. Hereinafter, a signal obtained by performing the BPF process on the composite signal for a frame is called a BPF output signal, which is denoted by "F". The BPF output signals of the composite signals for the frames in the equation (1) are expressed by the equation (2):

$$F1 = -(u1 + v1)$$
$$F2 = +(u2 - v2)$$
$$F3 = +(u3 + v3) \quad (2)$$
$$F4 = -(u4 - v4)$$
$$F5 = -(u5 + v5)$$

where F is a BPF output signal, u is the carrier chrominance signal (carrier U signal), and v is the carrier chrominance signal (carrier V signal).

In a carrier chrominance signal extracting (U/V separation) technique according to the present invention, the color phase distortion correcting color signal for a frame of interest (frame 3) is obtained three-dimensionally (hereinafter called a 3D color phase distortion correcting color signal), and the addition/subtraction of the carrier color signal for frame 3 and the 3D color phase distortion correcting color signal is taken to extract the carrier chrominance signals for frame 3.

FIG. 1 is a schematic view of a U/V separator 1 according to the present invention. The U/V separator 1 comprises a BPF processing unit 12 and a carrier chrominance signal extracting unit 16.

The BPF processing unit 12 performs the BPF process for frames 2, 3 to produce their respective BPF output signals F2, F3.

The carrier chrominance signal extracting unit 16 takes the addition/subtraction of the BPF output signal F3 for frame 3 and the BPF output signal F2 for frame 2. As seen from the equation (2), the addition/subtraction in the carrier chrominance signal extracting unit 16 extracts the carrier U signal and carrier V signal for frame 3.

That is, the BPF processing unit 12 of the U/V separator 1 functions as both a frame carrier color signal extracting unit and a 3D color phase distortion correcting color signal acquiring unit and supplies the BPF output signal F3 for frame 3 and the BPF output signal F2 for frame 2 as a frame carrier color signal and a 3D color phase distortion correcting color signal to the carrier chrominance signal extracting unit 16.

With the U/V separator 1 of FIG. 1, U/V separation can be correctly performed for a line which differs in color from other lines before and after it in a frame. This will be described using the example shown in FIG. 14.

Figure 14:
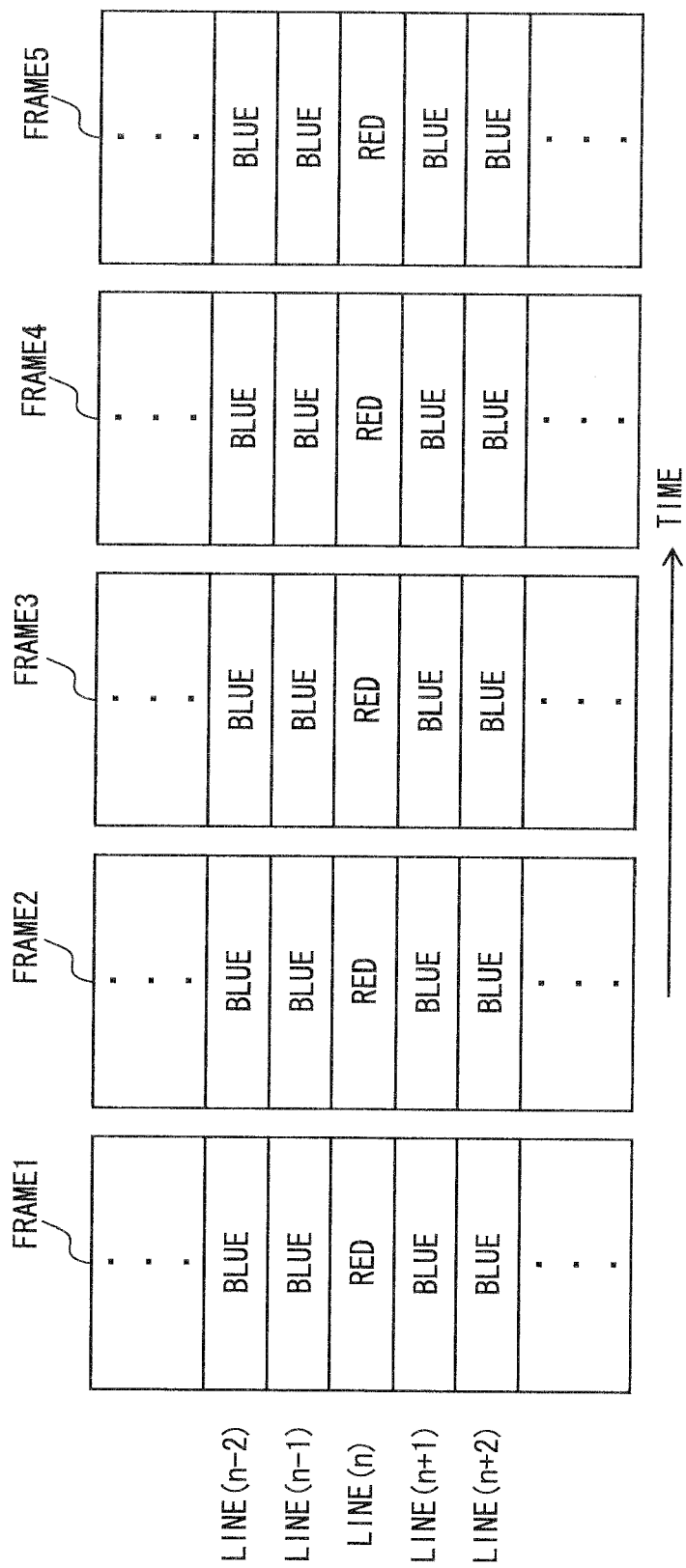
FIG. 14 is a view for explaining yet another problem with the related art technique.

In the example of FIG. 14, in each of frames 1 to 5, only line (n) of interest is red and the other lines are blue. In Y/C separation for frame 3 by the U/V separator 1, the addition/subtraction of the BPF output signal (red) for line (n) of interest in frame 3 and the BPF output signal (red) for line (n) of interest in frame 2 is taken, and hence U/V separation can be correctly performed for line (n).

Figure 2:
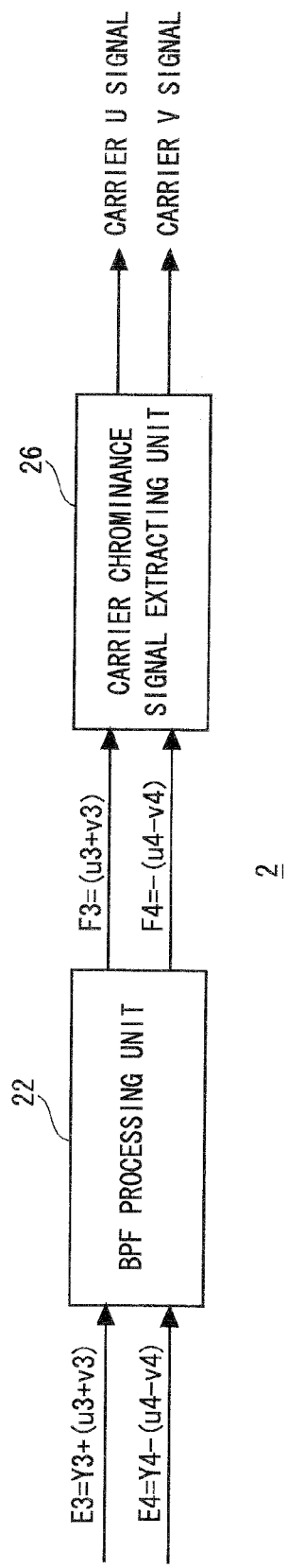
FIG. 2 is a schematic view of a U/V separator 2 for describing a technique according to the present invention.

FIG. 2 is a schematic view of a U/V separator 2 according to the present invention. The U/V separator comprises a BPF processing unit 22 and a carrier chrominance signal extracting unit 26.

The BPF processing unit 22 performs the BPF process for frames 3, 4 to produce their respective BPF output signals F3, F4.

The carrier chrominance signal extracting unit 26 takes the addition/subtraction of the BPF output signal F3 for frame 3 and the BPF output signal F4 for frame 4. As seen from the equation (2), the addition/subtraction in the carrier chrominance signal extracting unit 26 extracts the carrier U signal and carrier V signal for frame 3.

That is, the BPF processing unit 22 of the U/V separator 2 functions as both a frame carrier color signal extracting unit and a 3D color phase distortion correcting color signal acquiring unit and supplies the BPF output signal F3 for frame 3 and the BPF output signal F4 for frame 4 as a frame carrier color signal and a 3D color phase distortion correcting color signal to the carrier chrominance signal extracting unit 26.

The U/V separator 2 also produces the same effect as the U/V separator 1 of FIG. 1.

Figure 3:
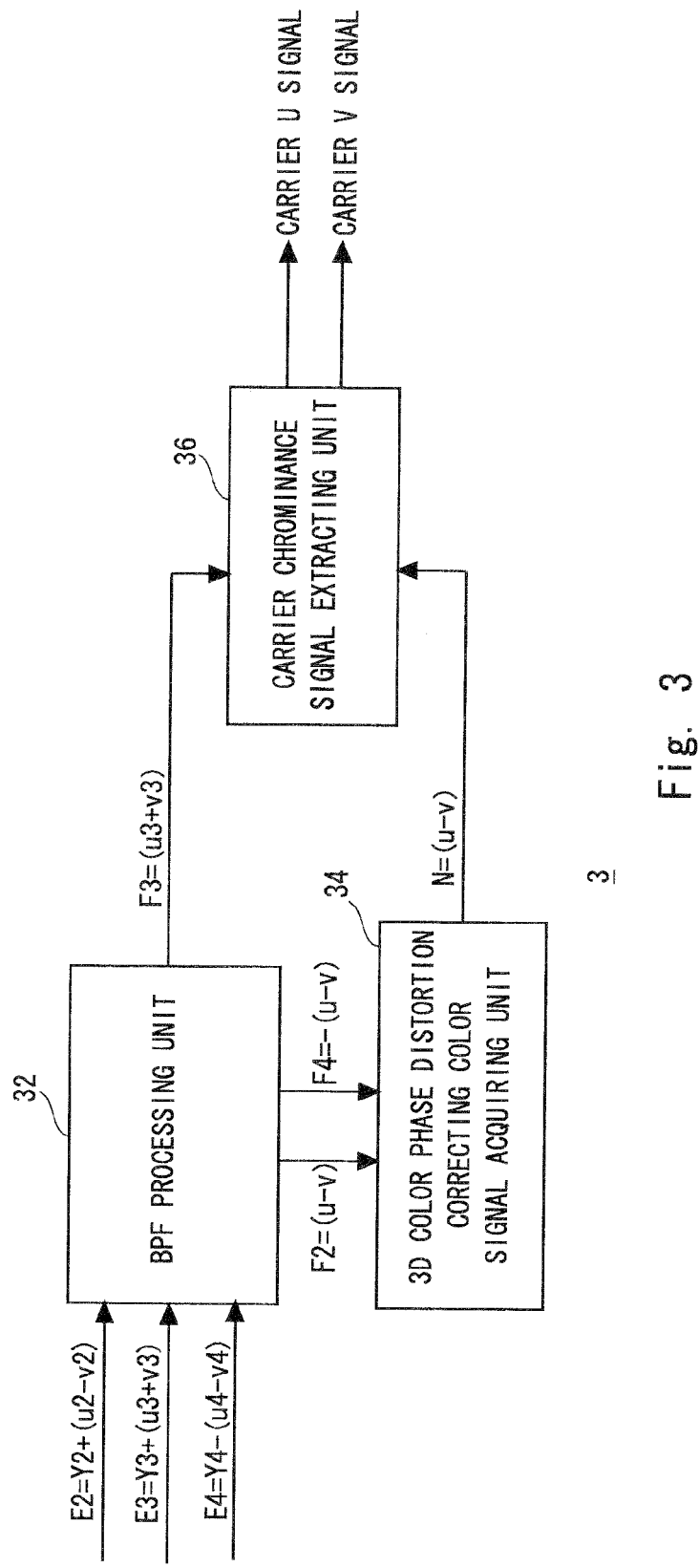
FIG. 3 is a schematic view of a U/V separator 3 for describing a technique according to the present invention.

FIG. 3 is a schematic view of a U/V separator 3 according to the present invention. The U/V separator 3 comprises a BPF processing unit 32, a 3D color phase distortion correcting color signal acquiring unit 34, and a carrier chrominance signal extracting unit 36.

The BPF processing unit 32 performs the BPF process for frame 2 preceding frame 3, frame 3, frame 4 following frame 3 to produce their respective BPF output signals F2, F3, F4.

The 3D color phase distortion correcting color signal acquiring unit 34 generates the 3D color phase distortion correcting color signal N using the BPF output signal F2 for frame 2 and the BPF output signal F4 for frame 4. To be specific, the 3D color phase distortion correcting color signal N is generated by taking an average of the BPF output signal F2 and an inverted signal of the BPF output signal F4.

The carrier chrominance signal extracting unit 36 takes the addition/subtraction of the BPF output signal F3 for frame 3 and the 3D color phase distortion correcting color signal N generated by the 3D color phase distortion correcting color signal acquiring unit 34. As seen from the equation (2), the addition/subtraction in the carrier chrominance signal extracting unit 36 extracts the carrier U signal and carrier V signal for frame 3.

The U/V separator 3 also produces the same effect as the U/V separator 1 and the U/V separator 2. Further, for example, in the case of using the BPF output signal F2 for frame 2 as it is as the 3D color phase distortion correcting color signal, U/V separation may not be correctly performed for frame 3 if line (n) of frame 2 and line (n) of frame 3 are different in color. Likewise, in the case of using the BPF output signal F4 for frame 4 as it is as the 3D color phase distortion correcting color signal, U/V separation may not be correctly performed for frame 3 if line (n) of frame 3 and line (n) of frame 4 are different in color. The U/V separator 3 takes an average of the BPF output signal for the frame preceding a frame of interest and an inverted signal of the BPF output signal for the frame following the frame of interest to generate the 3D color phase distortion correcting color signal for the frame of interest, and hence such a risk can be reduced.

Figure 4:
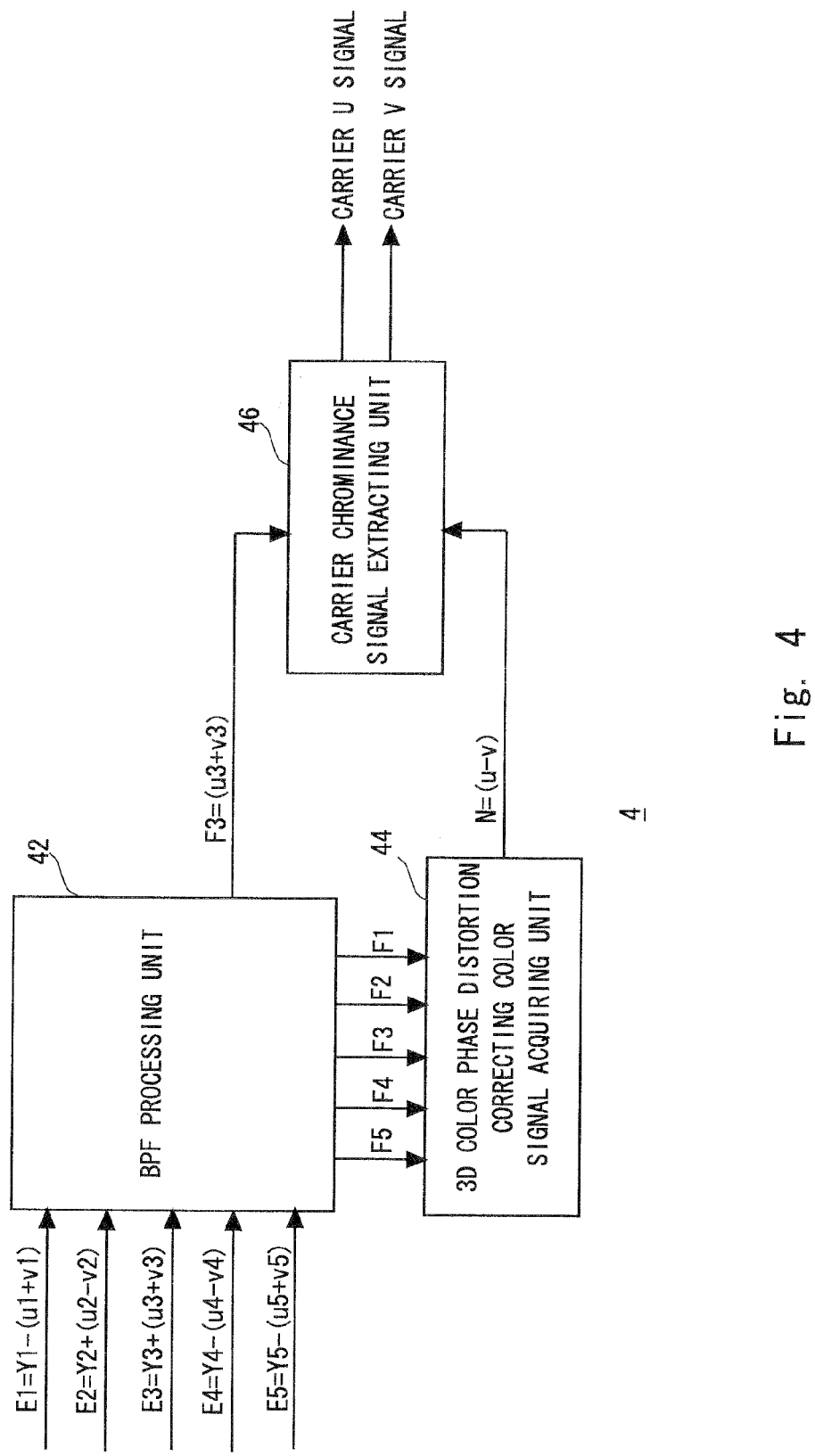
FIG. 4 is a schematic view of a U/V separator 4 for describing a technique according to the present invention.

FIG. 4 is a schematic view of a U/V separator 4 according to the present invention. The U/V separator 4 comprises a BPF processing unit 42, a 3D color phase distortion correcting color signal acquiring unit 44, and a carrier chrominance signal extracting unit 46.

The BPF processing unit 42 performs the BPF process for five frames 1 to 5 to produce their respective BPF output signals F1 to F5.

The 3D color phase distortion correcting color signal acquiring unit 44 generates the 3D color phase distortion correcting color signal N using the BPF output signal F1 to F5.

The carrier chrominance signal extracting unit 46 takes the addition/subtraction of the BPF output signal F3 for frame 3 and the 3D color phase distortion correcting color signal N generated by the 3D color phase distortion correcting color signal acquiring unit 44.

Figure 5:
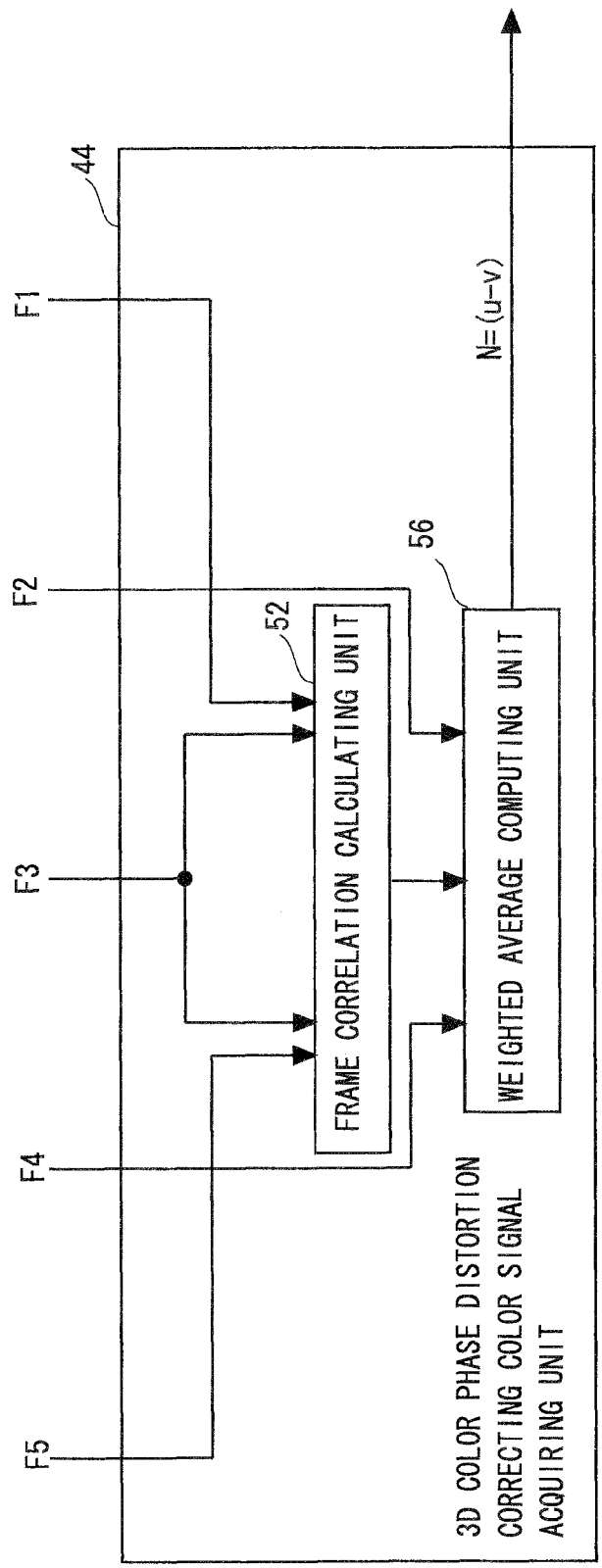
FIG. 5 shows a 3D color phase distortion correcting color signal acquiring unit of the U/V separator in FIG. 4.

FIG. 5 shows the details of the 3D color phase distortion correcting color signal acquiring unit 44, which comprises a frame correlation calculating unit 52 and a weighted average computing unit 56. The frame correlation calculating unit 52 calculates a correlation between the BPF output signal F1 and the BPF output signal F3 (hereinafter called a first correlation) and a correlation between the BPF output signal F3 and the BPF output signal F5 (hereinafter called a second correlation) and outputs information indicating a relative magnitude relation between the two correlations (e.g., the ratio of the first correlation to the second correlation) to the weighted average computing unit 56.

The weighted average computing unit 56 takes a weighted average of the BPF output signal F2 and an inverted signal of the BPF output signal F4 with weights according to the relative magnitude relation between the two correlations, thereby generating the 3D color phase distortion correcting color signal N. To be specific, for example, a weighted average is taken such weights that as the ratio of the first correlation to the second correlation becomes larger, the weight of the BPF output signal F2 is made larger with the weight of the inverted signal of the BPF output signal F4 made smaller and that conversely, as the ratio of the first correlation to the second correlation becomes smaller, the weight of the BPF output signal F2 is made smaller with the weight of the inverted signal of the BPF output signal F4 made larger.

The U/V separator 4 produces the same effect as the U/V separators 1 to 3 and also can avoid the drawback of these U/V separators.

For example, if frames 2 and 3 are similar in color and frames 3 and 4 are different in color, the ratio of the first correlation to the second correlation is large. In this case, because the U/V separator 4 takes a weighted average with the weight of the BPF output signal F2 for frame 2 being large and the weight of the BPF output signal F4 for frame 4 being small to generate the 3D color phase distortion correcting color signal N, the influence of the color of frame 4 can be reduced.

When the ratio of the first correlation to the second correlation is greater than a predetermined threshold indicating that frames 3 and 5 are much different in color, by making the weight of the inverted signal of the BPF output signal F4 for frame 4 zero, the U/V separator 4 becomes the same as the U/V separator 1. On the other hand, when the ratio of the first correlation to the second correlation is smaller than a predetermined threshold indicating that frames 3 and 1 are much different in color, by making the weight of the BPF output signal F2 for frame 2 zero, the U/V separator 4 becomes the same as the U/V separator 2. Further, when the first correlation and the second correlation is the same in magnitude, by making the weights of the BPF output signals for frames 2, 4 both ½, the U/V separator 4 becomes the same as the U/V separator 3.

Although in each of the above U/V separators the BPF processing unit also functions as the frame carrier color signal extracting unit, producing the BPF output signal F3 for frame 3 of interest as the carrier color signal for frame 3, for example, a carrier color signal extracted by applying a frame logical comb filter to the BPF output signals of frames 1, 3, and 5 may be used as the carrier color signal for frame 3.

Moreover, a luminance signal extracting unit to extract the luminance signal may be added to each of the above U/V separators, thereby realizing a Y/U/V separator. The luminance signal extracting unit may be configured, for example, to subtract the carrier color signal extracted by the above frame logical comb filter from the composite signal E3 for frame 3 of interest.

Further, in such a Y/U/V separator, the carrier chrominance signal extracting unit and the luminance signal extracting unit need not use the same carrier color signal. For example, the luminance signal extracting unit may subtract the carrier color signal extracted by the above frame logical comb filter from the composite signal E3 for frame 3 of interest to extract the luminance signal. Meanwhile, the carrier chrominance signal extracting unit may take the addition/subtraction of a carrier color signal and the 3D color phase distortion correcting color signal using the BPF output signal of frame 3 of interest as the carrier color signal, thereby extracting the carrier chrominance signals.

Figure 6:
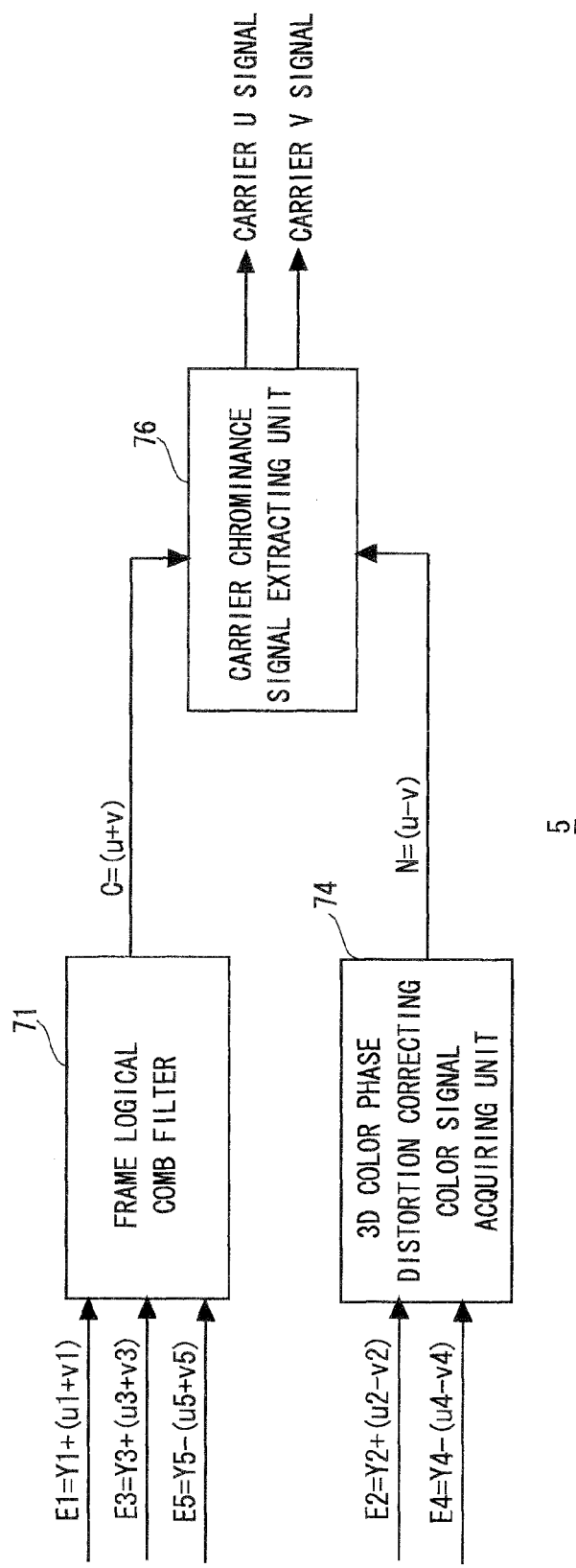
FIG. 6 is a schematic view of a U/V separator 5 for describing a technique according to the present invention.

FIG. 6 is a schematic view of a U/V separator 5 according to the present invention. The U/V separator 5 comprises a frame logical comb filter 71, a 3D color phase distortion correcting color signal acquiring unit 74, and a carrier chrominance signal extracting unit 76.

The frame logical comb filter 71 functions as the frame carrier color signal extracting unit and performs logical comb filtering on the composite signals for frames 1, 3, 5, thereby extracting a carrier color signal C (=u+v) closest to the carrier color signal for frame 3. The frame logical comb filter 71 of the U/V separator 5 directly extracts the carrier color signal for a frame of interest from the composite signals for frames without performing the BPF process. Accordingly, in FIG. 6, the output of the frame logical comb filter 71 is denoted as C in order to distinguish from the BPF output signals.

The 3D color phase distortion correcting color signal acquiring unit 74 generates the 3D color phase distortion correcting color signal N using the composite signals for the frames preceding and following a frame of interest. To be specific, an average of an inverted signal of the composite signal for frame 4 and the composite signal for frame 2 is taken as the 3D color phase distortion correcting color signal N for frame 3.

The carrier chrominance signal extracting unit 76 takes the addition/subtraction of the carrier color signal C for frame 3 extracted by the frame logical comb filter 71 and the 3D color phase distortion correcting color signal N generated by the 3D color phase distortion correcting color signal acquiring unit 74, thereby extracting the carrier U signal and carrier V signal for frame 3.

The U/V separator 5 also produces the same effect as the U/V separator 1 and the U/V separator 2. Further, because the carrier color signal is extracted using both frames before and after frame 3 of interest, the U/V separator 5 also produces the same effect as the U/V separator 3.

Needless to say, a luminance signal extracting unit to extract the luminance signal may be added to the U/V separator 5, thereby realizing a Y/U/V separator. The luminance signal extracting unit may be configured, for example, to subtract the carrier color signal C extracted by the frame logical comb filter 71 from the composite signal E3 for frame 3 of interest.

Although the U/V separator 5 extracts the carrier color signal C with use of the frame logical comb filter 71, it may perform a computation expressed as (2×E3−(E1+E5))/4 on the composite signals for frames 1, 3, 5 to extract the carrier color signal for frame 3.

Embodiments of the above principle will be described.

First Embodiment

Figure 7:
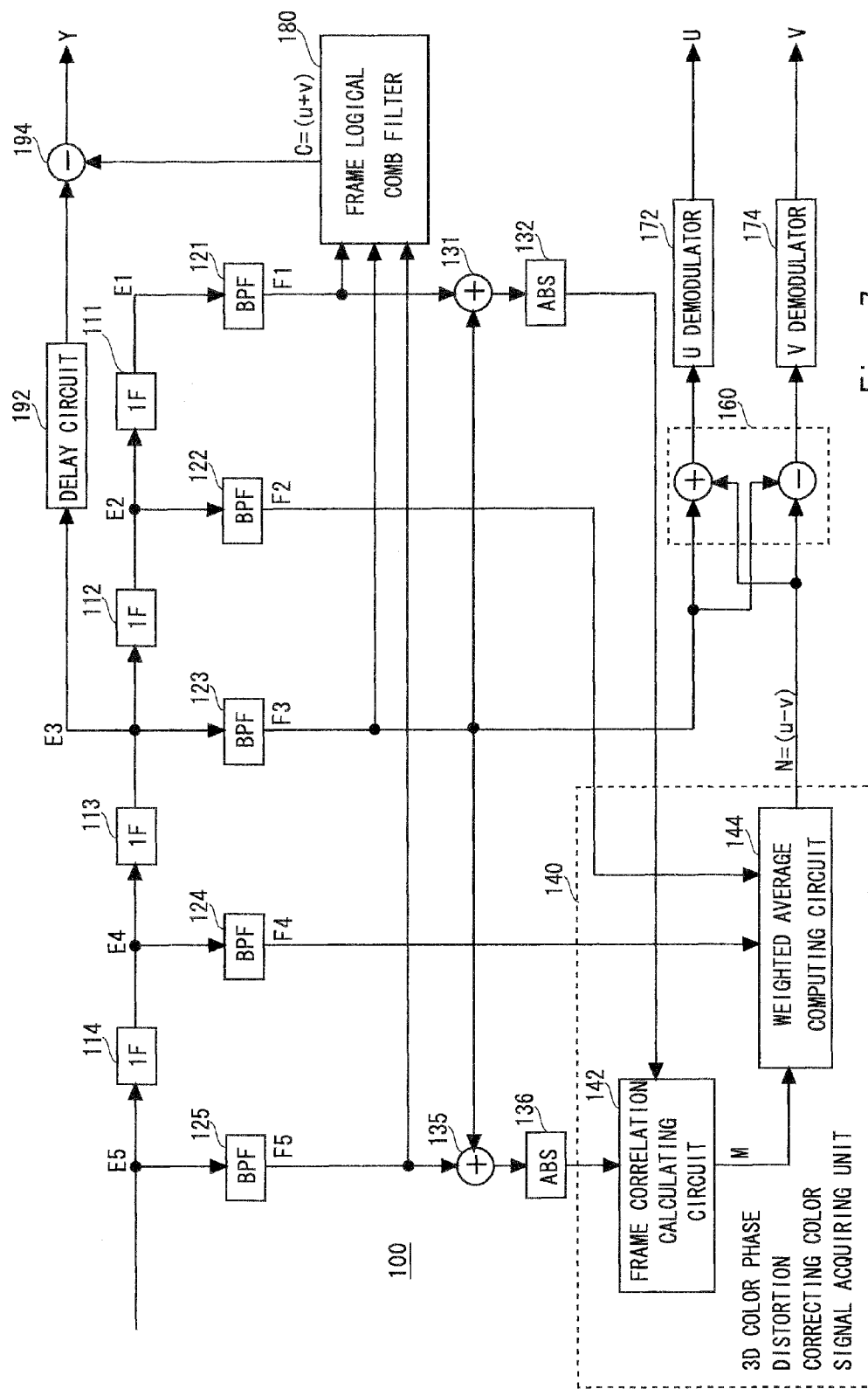
FIG. 7 shows a PAL signal demodulating apparatus according to a first embodiment of the present invention.

FIG. 7 shows a PAL signal demodulating apparatus 100 according to a first embodiment of the present invention. The PAL signal demodulating apparatus 100 comprises delay circuits 111 to 114 which each delay their input frame by one frame period. These four delay circuits are serially connected and respectively output signals E1 to E4 for frames 1 to 4 at the same time that signal E5 for frame 5 is input to the PAL signal demodulating apparatus 100. That is, an input frame is delayed by four frame periods, three frame periods, two frame periods, and one frame period by the delay circuits 111 to 114.

E1 to E4 from the four delay circuits 111 to 114 and E5 are output respectively to five band pass filter BPFs 121 to 125. The BPFs 121 to 125 each function as a BPF processing unit. Each BPF has a chroma pass band of, e.g., $fsc_{(PAL)} \pm 1.3$ MHz with color subcarrier frequency $fsc_{(PAL)}$ of the PAL signal as the center frequency and removes the luminance component from the PAL signal to a certain degree. As shown in FIG. 7, the BPFs 121 to 125 perform band pass filtering on signals E1 to E5 for frames 1 to 5 respectively, thereby producing the respective BPF output signals F1 to F5 for the frames.

An adder 131 adds the BPF output signal F1 for frame 1 and the BPF output signal F3 for frame 3. An ABS 132 takes the absolute value of the adding result of the adder 131 and outputs to a frame correlation calculating circuit 142 described later.

An adder 135 adds the BPF output signal F3 for frame 3 and the BPF output signal F5 for frame 5. An ABS 136 takes the absolute value of the adding result of the adder 135 and outputs to a frame correlation calculating circuit 142.

The frame correlation calculating circuit 142 calculates a correlation between frames 1 and 3 from the output of the ABS 132 and a correlation between frames 3 and 5 from the output of the ABS 136 and outputs the ratio between the two correlations (correlation ratio M) to a weighted average computing circuit 144 described later. Hereinafter frames 1 and 3 and frames 3 and 5 are each called a frame pair.

The absolute value from the ABS 132 being larger indicates the color difference between frames 1 and 3 being larger, i.e., the correlation being smaller, and the absolute value from the ABS 136 being larger indicates the color difference between frames 3 and 5 being larger, i.e., the correlation being smaller. In the present embodiment, the frame correlation calculating circuit 142 outputs the inverses of the absolute values from the ABS 132 and the ABS 136 as the correlations. The correlation ratio M output from the frame correlation calculating circuit 142 is the quotient of the output of the ABS 136 and the output of the ABS 132, and the correlation ratio M being larger indicates that the degree to which the colors of frames 3 and 1 are similar is greater than the degree to which the colors of frames 3 and 5 are similar.

The BPF output signal F2 for frame 2, the BPF output signal F4 for frame 4, and the correlation ratio M are input to the weighted average computing circuit 144, which takes a weighted average of the BPF output signal F2 and an inverted signal of the BPF output signal F4 with weights according to the correlation ratio M, thereby generating a 3D color phase distortion correcting color signal N (=u−v). In the weighted average computing circuit 144, of the BPF output signal F2 and an inverted signal of the BPF output signal F4, the BPF output signal (or an inverted signal thereof in the case of the BPF output signal F4) for the frame located between the frames of one of the two frame pairs which has a larger correlation is weighted with a larger weight than is the BPF output signal (or an inverted signal thereof in the case of the BPF output signal F4) for the frame located between the frames of the other frame pair to take a weighted average thereof, as computed using, e.g., the following equation (3) in the present embodiment:

$$N = F2 \times M/(M+1) + (-F4) \times 1/(M+1) \quad (3)$$

where N is the 3D color phase distortion correcting color signal, F2 is the BPF output signal for frame 2, F4 is the BPF output signal for frame 4, and M is the quotient of the color correlation between F1 and F3 and the color correlation between F5 and F3.

The weighted average computing circuit 144 generates a 3D color phase distortion correcting color signal N according to the equation (3) and outputs to a carrier chrominance signal extracting circuit 160.

In the present embodiment, the frame correlation calculating circuit 142 and the weighted average computing circuit 144 form a 3D color phase distortion correcting color signal acquiring unit 140.

The carrier chrominance signal extracting circuit 160 extracts the carrier chrominance signals (carrier U signal and carrier V signal) for frame 3 of interest, and from the BPF 123 and the weighted average computing circuit 144, the BPF output signal F3 for frame 3 and the 3D color phase distortion correcting color signal N are respectively input thereto. The carrier chrominance signal extracting circuit 160 comprises an adder and a subtracter and adds the BPF output signal F3 and the 3D color phase distortion correcting color signal N to obtain the carrier U signal and subtracts the 3D color phase distortion correcting color signal N from the BPF output signal F3 to obtain the carrier V signal.

The carrier chrominance signal extracting circuit 160 outputs the carrier U signal and the carrier V signal to a U demodulator 172 and a V demodulator 174 respectively. The U demodulator 172 demodulates the carrier U signal into the U signal, and the V demodulator 174 demodulates the carrier V signal into the V signal.

Next, luminance will be described.

The composite signal E3 for frame 3, which is the output of the delay circuit 113, is output to a delay circuit 192 as well. The delay circuit 192 is for adjusting the timing at which to extract the luminance component and delays the signal E3 and outputs to a subtracter 194.

The frame logical comb filter 180 is for performing logical comb filtering between frames and extracts a carrier color signal C (=u+v) closest to the carrier color signal contained in the BPF output signal F3 for frame 3 from the BPF output signals F1, F3, F5 output from the BPFs 121, 123, 125.

The subtracter 194 subtracts the carrier color signal C extracted by the frame logical comb filter 180 from the composite signal E3 for frame 3 to obtain the luminance signal Y. That is, the subtracter 194 functions as a luminance signal extracting unit.

As such, the PAL signal demodulating apparatus 100 of the present embodiment generates the 3D color phase distortion correcting color signal for a frame of interest using the BPF output signals for the frames preceding and subsequent to the frame of interest and takes the addition/subtraction of the BPF output signal for the frame of interest and the 3D color phase distortion correcting color signal, thereby extracting the carrier chrominance signals for the frame of interest. Hence, even if there is a line different in color from other lines in the frame of interest, the carrier chrominance signals for this line can be correctly extracted.

Moreover, with the related art technique where Y/C separation is performed on the PAL signal to obtain the carrier color signal C and then U/V separation is performed on the carrier color signal C, in performing U/V separation on the carrier color signal C, the line preceding a line of interest, or the line of interest, needs to be delayed by one line period in order to take the addition/subtraction of the carrier color signal for the line of interest and the carrier color signal for the line preceding or following the line of interest. Meanwhile, in the present embodiment, color phase distortion correction and U/V separation are carried out simultaneously by taking the addition/subtraction of the BPF output signal for a frame of interest and the 3D color phase distortion correcting color signal. Hence, at least a one-line-period delay circuit can be omitted as compared to the related art technique, and thus the circuit scale and processing time can be reduced.

Further, the luminance signal is extracted by obtaining three-dimensionally the carrier color signal C for a frame of interest by the frame logical comb filter 180 and subtracting it from the composite signal for the frame of interest, and hence, even if there is a line different in color from other lines in the frame of interest, the luminance signal for this line can be correctly extracted.

In the present embodiment, although the carrier chrominance signal extracting circuit 160 takes the addition/subtraction of the BPF output signal F3 for frame 3 and the 3D color phase distortion correcting color signal N, thereby extracting the carrier chrominance signals, it may extract the carrier chrominance signals by taking the addition/subtraction of the carrier color signal C extracted by the frame logical comb filter 180 and the 3D color phase distortion correcting color signal N.

Second Embodiment

The PAL signal demodulating apparatus 100 of the first embodiment obtains three-dimensionally the color phase distortion correcting color signal N for U/V separation and the carrier color signal C for extracting the luminance signal and hence can produce the desired effect particularly in Y/U/V separation for still images where changes exist between lines in the same frame with fewer changes between frames.

As described in reference 2, by performing combined Y/C separation of the two-dimensional Y/C separation and the three-dimensional Y/C separation, so-called motion-adaptive Y/C separation, degradation in image quality when switching between moving images and still images can be suppressed. Also in the U/V separation technique of the present invention, a motion-adaptive U/V separator and a Y/U/V separator can be realized, which will be described as a second embodiment.

Figure 8:
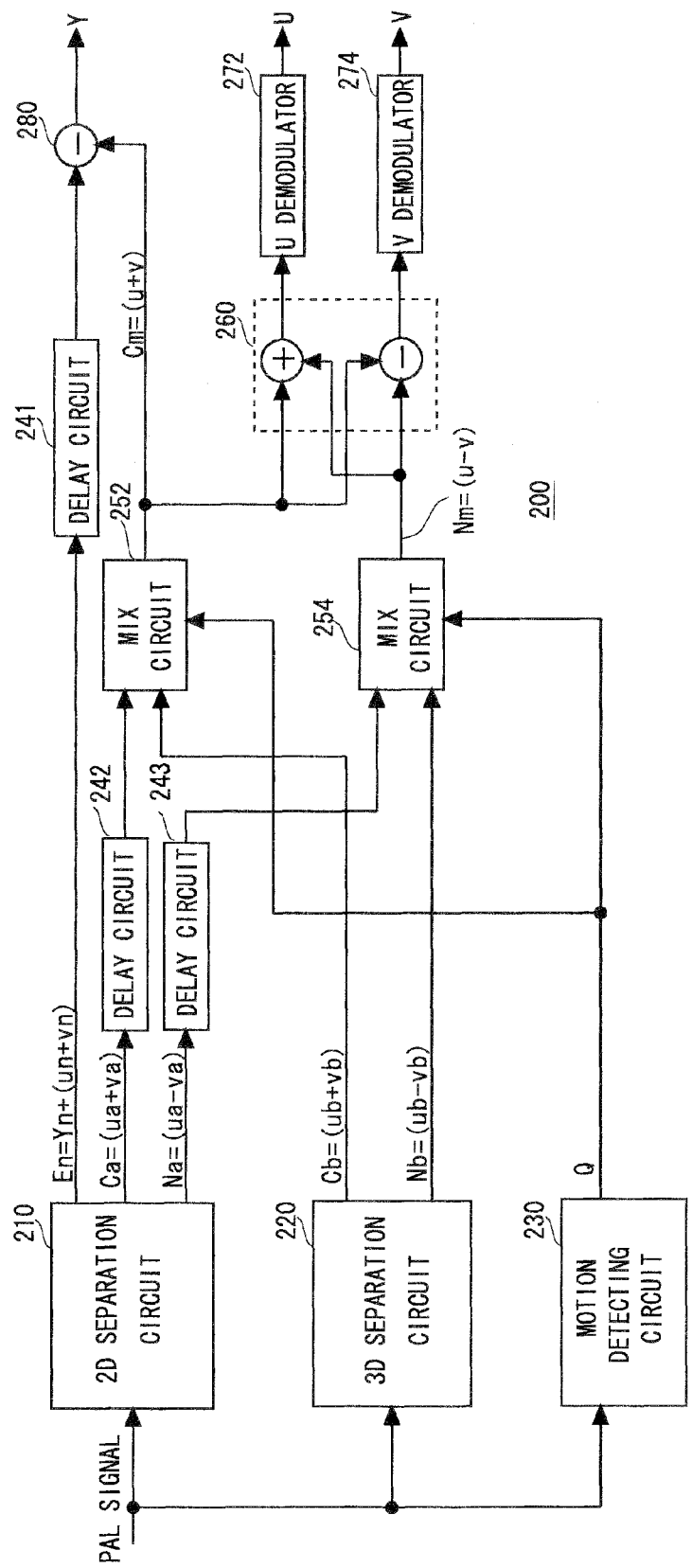
FIG. 8 shows a PAL signal demodulating apparatus according to a second embodiment of the present invention.

FIG. 8 shows a PAL signal demodulating apparatus 200 according to the second embodiment of the present invention. The PAL signal demodulating apparatus 200 comprises a two-dimensional separation circuit 210, a three-dimensional separation circuit 220, a motion detecting circuit 230, a MIX circuit 252, a MIX circuit 254, a carrier chrominance signal extracting circuit 260, a U demodulator 272, a V demodulator 274, and a subtracter 280. Also, delay circuits 241, 242, 243 for adjusting various process timings are provided in the PAL signal demodulating apparatus 200.

The three-dimensional separation circuit 220, by frame delay, produces the 3D color phase distortion correcting color signal N for U/V separation (hereinafter denoted as Nb) and the carrier color signal C for extracting the luminance signal (hereinafter denoted as Cb).

The three-dimensional separation circuit 220 may use any technique of the U/V separators 1 to 4 in extracting the 3D color phase distortion correcting color signal Nb. In the present embodiment, the three-dimensional separation circuit 220 extracts the 3D color phase distortion correcting color signal Nb using, but not limited to, the technique of the U/V separator 4.

In order to obtain the carrier color signal Cb for extracting the luminance component, the demodulating apparatus 200 uses, but not limited to, a frame logical comb filter as the PAL signal demodulating apparatus 100 of the first embodiment does.

That is, in the PAL signal demodulating apparatus 200 of the present embodiment, the three-dimensional separation circuit 220 is configured as the PAL signal demodulating apparatus 100 of FIG. 7 would be without the delay circuit 192, the subtracter 194, the carrier chrominance signal extracting circuit 160, the U demodulator 172, and the V demodulator 174.

The three-dimensional separation circuit 220 outputs the carrier color signal Cb and the 3D color phase distortion correcting color signal Nb to the MIX circuits 252 and 254 respectively.

The two-dimensional separation circuit 210, by line delay in a frame of interest, produces the 2D color phase distortion correcting color signal N for U/V separation (hereinafter denoted as Na) and the carrier color signal C for extracting the luminance signal (hereinafter denoted as Ca). The two-dimensional separation circuit 210 performs two-dimensionally a similar process to the one that the three-dimensional separation circuit 220 does three-dimensionally, and the separation circuit 210 deals with lines instead of frames, which the three-dimensional separation circuit 220 deals with.

In the present embodiment, the two-dimensional separation circuit 210 produces two-dimensionally the color phase distortion correcting color signal Na and the carrier color signal Ca by a similar method to the method of the three-dimensional separation circuit 220, specifically as follows.

The two-dimensional separation circuit 210 calculates a correlation between the BPF output signal for line (n) and the BPF output signal for line (n−2) preceding by two lines line (n) and a correlation between the BPF output signal for line (n) and the BPF output signal for line (n+2) subsequent by two lines to line (n) and takes a weighted average of the BPF output signals for lines (n−1) and (n+1) with weights according to the relative magnitude relation between the two correlations, thereby generating the 2D color phase distortion correcting color signal Na.

As to the carrier color signal Ca, the two-dimensional separation circuit 210 extracts it from the BPF output signals for lines (n−2), (n), (n+2) with use of a line logical comb filter.

That is, the two-dimensional separation circuit 210 is configured as the PAL signal demodulating apparatus 100 of FIG. 7 would be without the delay circuit 192, the subtracter 194, the carrier chrominance signal extracting circuit 160, the U demodulator 172, and the V demodulator 174 and with the delay circuits 111 to 114 replaced by delay circuits for delaying by one line period and the frame logical comb filter 180 replaced by a line logical comb filter, and hence a figure thereof is omitted.

The two-dimensional separation circuit 210 outputs the carrier color signal Ca for line (n) of interest and the 2D color phase distortion correcting color signal Na to delay circuits 242 and 243 respectively.

The delay circuit 242 delays the two-dimensional carrier color signal Ca from the two-dimensional separation circuit 210 so as to make its output timing coincide with the output timing of the carrier color signal Cb from the three-dimensional separation circuit 220 and outputs to the MIX circuit 252.

The delay circuit 243 delays the 2D color phase distortion correcting color signal Na from the two-dimensional separation circuit 210 so as to make its output timing coincide with the output timing of the 3D color phase distortion correcting color signal Nb from the three-dimensional separation circuit 220 and outputs to the MIX circuit 254.

The motion detecting circuit 230 detects the magnitude of motion in video (hereinafter simply called motion Q) from the PAL signal and outputs the detection result to the MIX circuits 252, 254.

The MIX circuit 252 has inputted thereto the carrier color signal Ca for line (n) of interest from the two-dimensional separation circuit 210, the carrier color signal Cb for line (n) of interest in a frame of interest from the three-dimensional separation circuit 220, and the motion Q from the motion detecting circuit 230 and takes a weighted average of the carrier color signal Ca and the carrier color signal Cb with weights according to the motion Q, thereby mixing them. To be specific, they are mixed in such a proportion that as the motion Q becomes larger, the proportion of the carrier color signal Ca becomes larger with the proportion of the carrier color signal Cb becoming smaller and that as the motion Q becomes smaller, the proportion of the carrier color signal Ca becomes smaller with the proportion of the carrier color signal Cb becoming larger.

The MIX circuit 254 has inputted thereto the 2D color phase distortion correcting color signal Na and the 3D color phase distortion correcting color signal Nb for line (n) of interest and the motion Q and takes a weighted average of the 2D color phase distortion correcting color signal Na and the 3D color phase distortion correcting color signal Nb with weights according to the motion Q, thereby mixing them. To be specific, they are mixed in such a proportion that as the motion Q becomes larger, the proportion of the 2D color phase distortion correcting color signal Na becomes larger with the proportion of the 3D color phase distortion correcting color signal Nb becoming smaller and that as the motion Q becomes smaller, the proportion of the 2D color phase distortion correcting color signal Na becomes smaller with the proportion of the 3D color phase distortion correcting color signal Nb becoming larger.

The MIX circuit 252 outputs a mixed carrier color signal Cm of the carrier color signal Ca and the carrier color signal Cb for line (n) of interest to the subtracter 280 and the carrier chrominance signal extracting circuit 260. The MIX circuit 254 outputs a mixed color phase distortion correcting color signal Nm of the 2D color phase distortion correcting color signal Na and the 3D color phase distortion correcting color signal Nb for line (n) of interest to the carrier chrominance signal extracting circuit 260.

The carrier chrominance signal extracting circuit 260 comprises an adder and a subtracter and adds the mixed carrier color signal Cm from the MIX circuit 252 and the mixed color phase distortion correcting color signal Nm from the MIX circuit 254, thereby extracting the carrier U signal and subtracts the mixed color phase distortion correcting color signal Nm from the mixed carrier color signal Cm, thereby extracting the carrier V signal.

The U demodulator 272 and the V demodulator 274 demodulate the carrier U signal and the carrier V signal into the U signal and the V signal respectively.

The subtracter 280 functions as a luminance signal extracting unit and subtracts the mixed carrier color signal Cm output from the MIX circuit 252 from the composite signal En for line (n) of interest, timing adjusted in the delay circuit 241, thereby extracting the luminance signal Y.

In this way, with the PAL signal demodulating apparatus 200 of the present embodiment where the U/V separation technique of the present invention is applied to a motion-adaptive PAL signal demodulating apparatus, if there is a line different in color from other lines in the same frame, a different color from the other lines is prevented from mixing into that line, and also degradation in image quality when switching between moving images and still images can be suppressed.

Although the carrier chrominance signal extracting circuit 260 of the present embodiment takes the addition/subtraction of the mixed carrier color signal Cm and the mixed color phase distortion correcting color signal Nm, thereby extracting the carrier chrominance signals, the carrier chrominance signals may be extracted by taking the addition/subtraction of the mixed color phase distortion correcting color signal Nm and the BPF output signal for line (n) of interest, which the two-dimensional separation circuit 210 uses to obtain the carrier color signal Ca.

Third Embodiment

Figure 9:
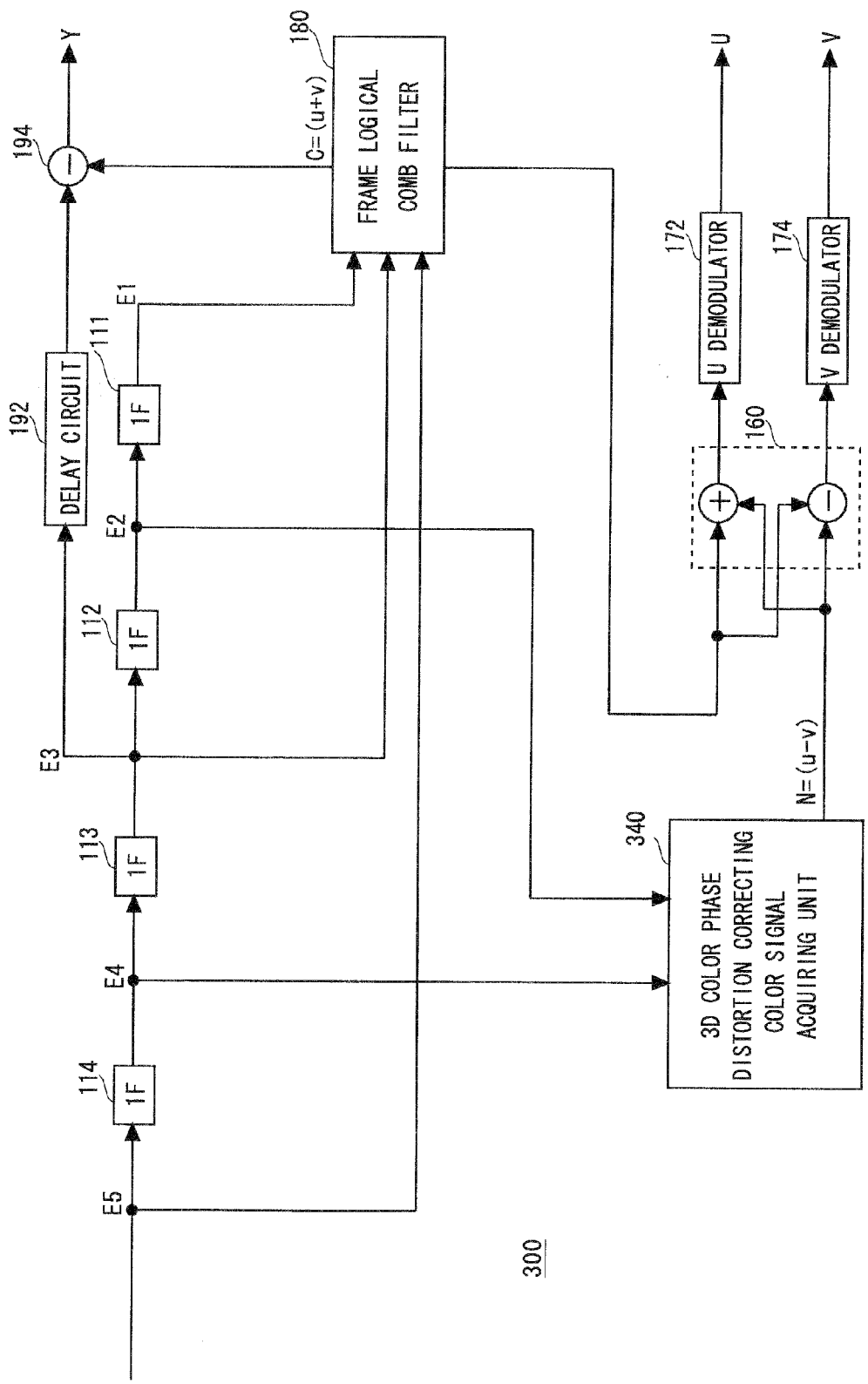
FIG. 9 shows a PAL signal demodulating apparatus according to a third embodiment of the present invention.
Figure 10:
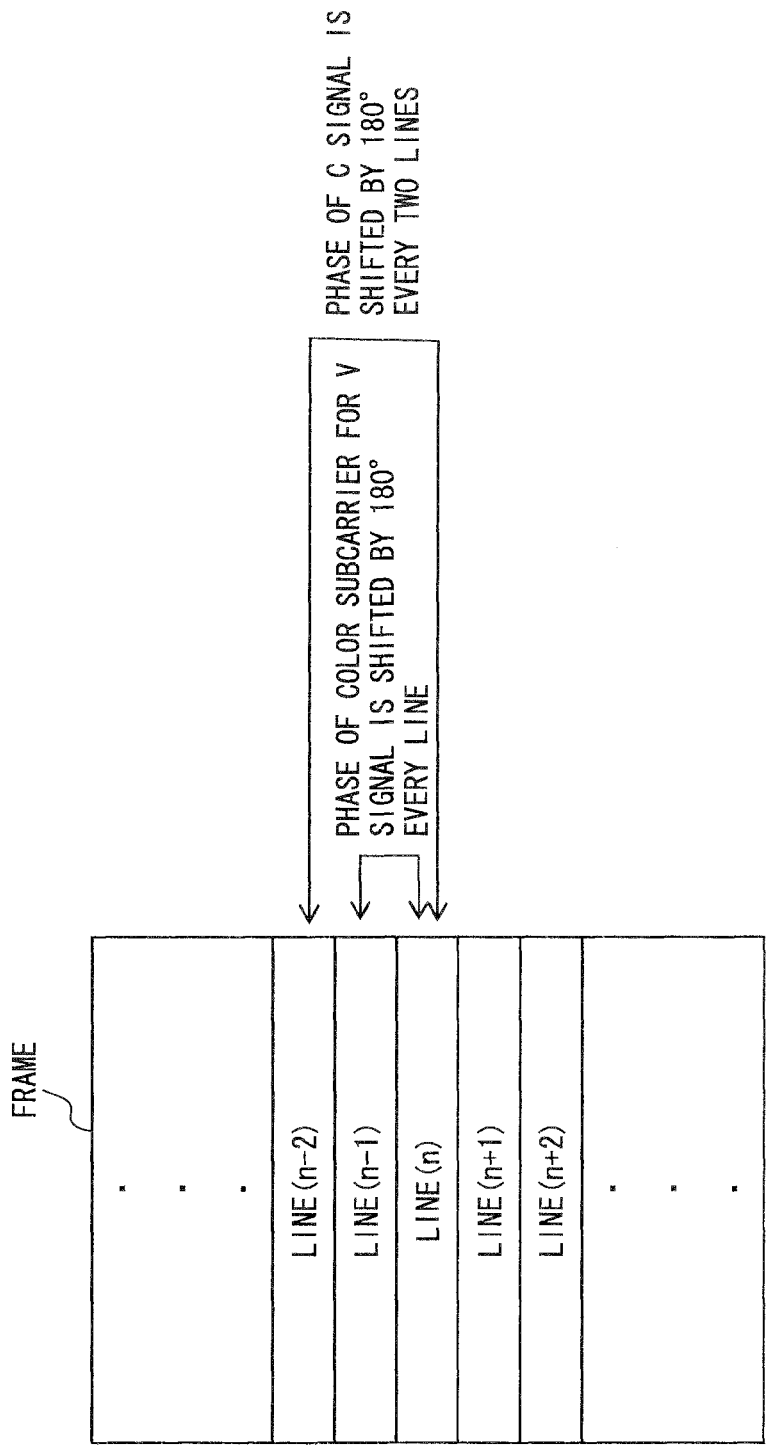
FIG. 10 shows using a characteristic of the PAL signal.
Figure 11:
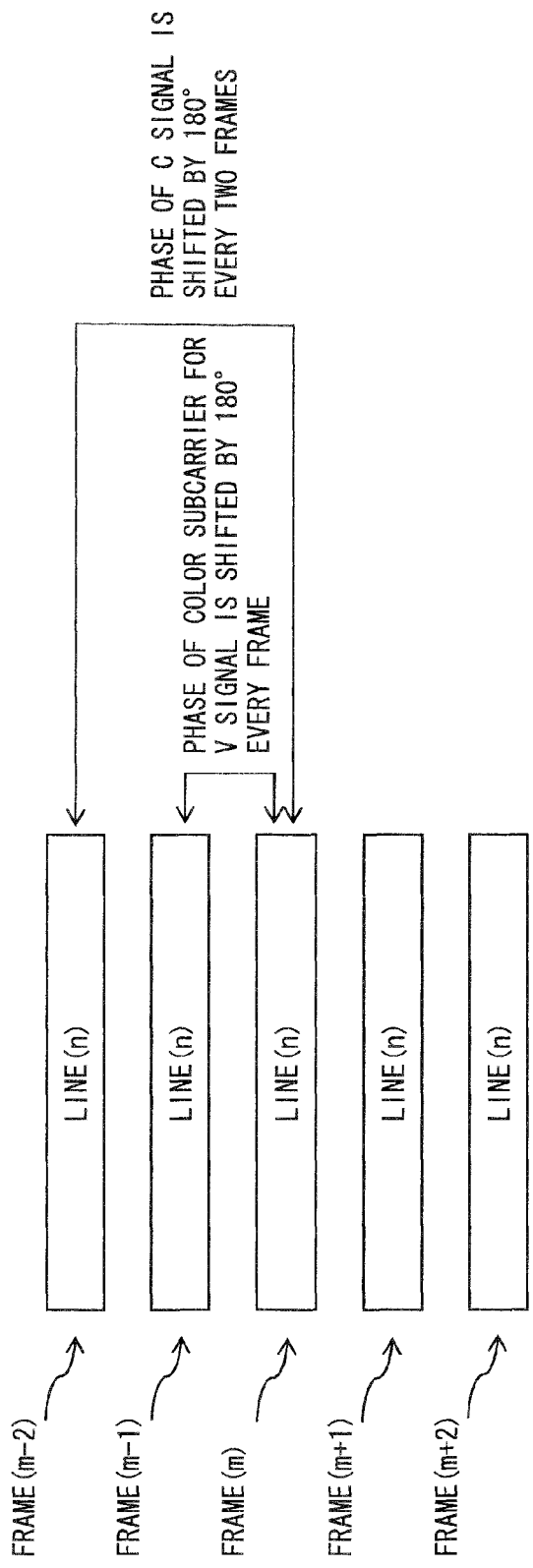
FIG. 11 shows using another characteristic of the PAL signal.
Figure 12:
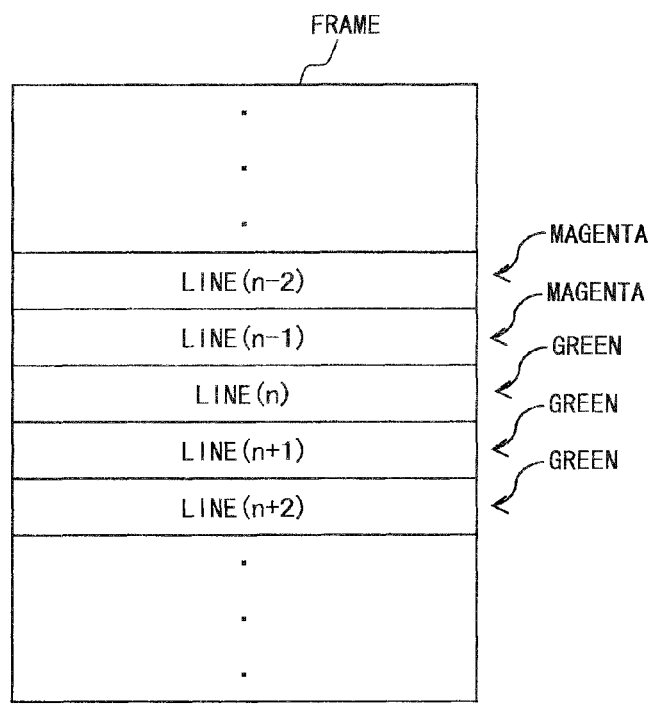
FIG. 12 is a view for explaining a problem with a related art technique.
Figure 13:
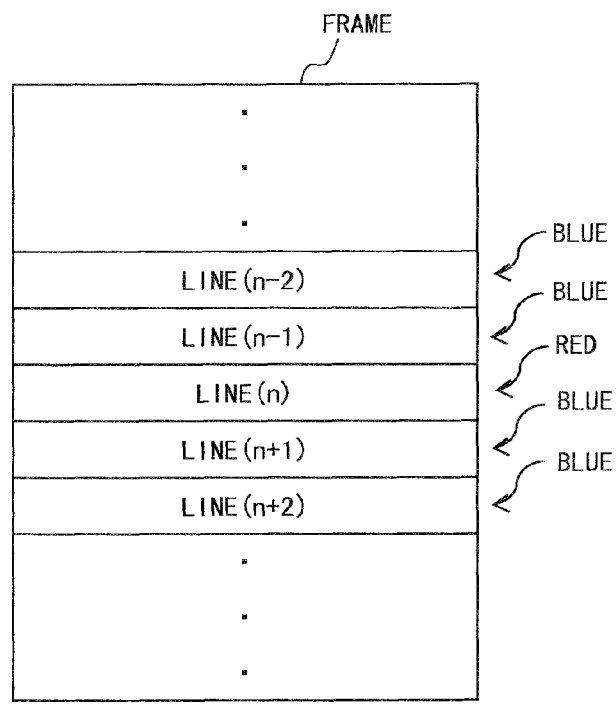
FIG. 13 is a view for explaining another problem with the related art technique.

FIG. 9 shows a PAL signal demodulating apparatus 300 according to a third embodiment of the present invention. The PAL signal demodulating apparatus 300 has the previously-described U/V separator 5 applied thereto. In FIG. 9, functional blocks that have the same configurations as in the PAL signal demodulating apparatus 100 of the first embodiment shown in FIG. 7 are denoted by the same reference numerals, and detailed description thereof is omitted.

In the PAL signal demodulating apparatus 300, E2 and E4 from among E1 to E4 output from the four delay circuits 111 to 114 and E5 are both input to a 3D color phase distortion correcting color signal acquiring unit 340. E1, E3, and E5 are input to the frame logical comb filter 180. Also, E3 is input to the delay circuit 192.

The 3D color phase distortion correcting color signal acquiring unit 340 takes an average of E2 and an inverted signal of E4 and outputs the average value as the 3D color phase distortion correcting color signal to the carrier chrominance signal extracting circuit 160.

The frame logical comb filter 180 performs between-frame logical comb filtering on input E1, E3, E5 and extracts a carrier color signal C (=u+v) closest to the carrier color signal contained in E3 and outputs this carrier color signal C to the subtracter 194 and the carrier chrominance signal extracting circuit 160.

The carrier chrominance signal extracting circuit 160 takes the addition/subtraction of the carrier color signal C from the frame logical comb filter 180 and the 3D color phase distortion correcting color signal N from the 3D color phase distortion correcting color signal acquiring unit 340, thereby obtaining the carrier U signal and the carrier V signal.

The carrier chrominance signal extracting circuit 160 outputs the carrier U signal and the carrier V signal to the U demodulator 172 and the V demodulator 174 respectively. The U demodulator 172 demodulates the carrier U signal into the U signal, and the V demodulator 174 demodulates the carrier V signal into the V signal.

The delay circuit 192 is for adjusting the timing to extract the luminance component for frame 3 and delays the signal E3 and outputs to the subtracter 194.

The subtracter 194 subtracts the carrier color signal C extracted by the frame logical comb filter 180 from E3 from the delay circuit 192 to obtain the luminance signal Y. That is, also in the PAL signal demodulating apparatus 300, the subtracter 194 functions as a luminance signal extracting unit.

As such, the PAL signal demodulating apparatus 300 of the present embodiment generates the 3D color phase distortion correcting color signal N for a frame of interest using the composite signals for the frames preceding and following the frame of interest and takes the addition/subtraction of the generated 3D color phase distortion correcting color signal N and the carrier color signal C for the frame of interest, thereby extracting the carrier chrominance signals for the frame of interest. Hence, even if there is a line different in color from other lines in the frame of interest, the carrier chrominance signals for this line can be correctly extracted.

Moreover, with the PAL signal demodulating apparatus 300 of the present embodiment, the above effect can be achieved with smaller circuit scale because a BPF processing unit to pass the chroma band is not necessary.

It is apparent that the present invention is not limited to the above embodiments, but may be modified and changed without departing from the scope and spirit of the invention.

What is claimed is:

1. A PAL signal demodulating apparatus which demodulates a composite signal of a PAL (phase alternating line) system, comprising:
   a frame carrier color signal extracting unit to extract a carrier color signal for a frame (m) of interest;
   a 3D color phase distortion correcting color signal acquiring unit to generate a 3D color phase distortion correcting color signal for the frame (m) of interest using one or both of a frame (m−1) preceding the frame (m) of interest and a frame (m+1) following the frame (m) of interest;
   a carrier chrominance signal extracting unit to take the addition/subtraction of the 3D color phase distortion correcting color signal and the carrier color signal extracted by the frame carrier color signal extracting unit, thereby extracting carrier chrominance signals for the frame (m) of interest;
   a BPF processing unit to perform band pass filtering on the composite signal to pass a chroma band, thereby producing a BPF output signal,
   the 3D color phase distortion correcting color signal acquiring unit configured to obtain one of the BPF output signals for the frame (m−1) and for the frame (m+1), or an average of an inverted signal of the BPF output signal for the frame (m+1) and the BPF output signal for the frame (m−1), as the 3D color phase distortion correcting color signal for the frame (m) of interest;
   a motion detecting unit to detect motion from the composite signal;
   a 2D color phase distortion correcting color signal acquiring unit to obtain one of the BPF output signals for a line (n−1) preceding a line (n) of interest and for a line (n+1) following the line (n) of interest, or an average of an inverted signal of the BPF output signal for the line (n+1) and the BPF output signal for the line (n−1), as a 2D color phase distortion correcting color signal for the line (n) of interest;
   an average color phase distortion correcting color signal acquiring unit to take a weighted average of the 3D color phase distortion correcting color signal for the line (n) of interest in the frame (m) of interest and the 2D color phase distortion correcting color signal for the line (n) of interest with such weights that the larger the motion detected by the motion detecting unit is, the larger the weight of the 2D color phase distortion correcting color signal, thereby producing an average color phase distortion correcting color signal for the line (n) of interest; and
   a line carrier color signal extracting unit to extract a carrier color signal for the line (n) of interest, the carrier chrominance signal extracting unit configured to take the addition/subtraction of the carrier color signal for the line (n) of interest extracted by the line carrier color signal extracting unit and the average color phase distortion correcting color signal, thereby extracting carrier chrominance signals for the line (n) of interest.

2. The PAL signal demodulating apparatus according to claim 1, wherein the 3D color phase distortion correcting color signal acquiring unit, for a weighted average of the BPF output signal for the frame (m−1) and an inverted signal of the BPF output signal for the frame (m+1), calculates a frame correlation between a frame (m−2) preceding by two frames the frame (m) of interest and the frame (m) of interest using the BPF output signals for them, calculates a frame correlation between a frame (m+2) subsequent by two frames to the frame (m) of interest and the frame (m) of interest using the BPF output signals for them, and takes a weighted average of the BPF output signal for the frame (m−1) and an inverted signal of the BPF output signal for the frame (m+1) with weights according to a relative magnitude relation between the two frame correlations.

3. The PAL signal demodulating apparatus according to claim 2, wherein the frame carrier color signal extracting unit supplies the BPF output signal for the frame (m) of interest as the carrier color signal to the carrier chrominance signal extracting unit.

4. The PAL signal demodulating apparatus according to claim 3, further comprising:
   a frame logical comb filter to extract the carrier color signal for the frame (m) of interest from the BPF output signals for the frame (m−2) preceding by two frames the frame (m) of interest, for the frame (m) of interest, and for the frame (m+2) subsequent by two frames to the frame (m) of interest; and a luminance signal extracting unit to subtract the carrier color signal extracted by the frame logical comb filter from a composite signal for the frame (m) of interest, thereby extracting a luminance signal for the frame (m) of interest.

5. The PAL signal demodulating apparatus according to claim 2, wherein the frame carrier color signal extracting unit is a frame logical comb filter to extract the carrier color signal for the frame (m) of interest from the BPF output signals for the frame (m−2) preceding by two frames the frame (m) of interest, for the frame (m) of interest, and for the frame (m+2) subsequent by two frames to the frame (m) of interest.

6. The PAL signal demodulating apparatus according to claim 5, further comprising:
a luminance signal extracting unit to subtract the carrier color signal for the frame (m) of interest extracted by the frame logical comb filter from a composite signal for the frame (m) of interest, thereby extracting a luminance signal.

7. The PAL signal demodulating apparatus according to claim 1, wherein the 2D color phase distortion correcting color signal acquiring unit calculates a line correlation between a line (n−2) preceding by two lines the line (n) of interest and the line (n) of interest using the BPF output signals for them, calculates a line correlation between a line (n+2) subsequent by two lines to the line (n) of interest and the line (n) of interest using the BPF output signals for them, and takes a weighted average of the BPF output signal for the line (n−1) and an inverted signal of the BPF output signal for the line (n+1) with weights according to a relative magnitude relation between the two line correlations, thereby producing the 2D color phase distortion correcting color signal.

8. The PAL signal demodulating apparatus according to claim 7, wherein the line carrier color signal extracting unit supplies the BPF output signal for the line (n) of interest as the carrier color signal to the carrier chrominance signal extracting unit.

9. The PAL signal demodulating apparatus according to claim 8, further comprising:
a line logical comb filter to extract the carrier color signal for the line (n) of interest from the BPF output signals for the line (n−2) preceding by two lines the line (n) of interest, for the line (n) of interest, and for the line (n+2) subsequent by two lines to the line (n) of interest;
a frame logical comb filter to extract the carrier color signal for the frame (m) of interest from the BPF output signals for the frame (m−2) preceding by two frames the frame (m) of interest, for the frame (m) of interest, and for the frame (m+2) subsequent by two frames to the frame (m) of interest;
an average carrier color signal extracting unit to take a weighted average of the carrier color signal for the line (n) of interest in the frame (m) of interest, extracted by the frame logical comb filter, and the carrier color signal for the line (n) of interest, extracted by the line logical comb filter, with such weights that the larger the motion detected by the motion detecting unit is, the larger the weight of the carrier color signal for the line (n) of interest extracted by the line logical comb filter, thereby producing an average carrier color signal for the line (n) of interest; and
a luminance signal extracting unit to subtract the average carrier color signal from a composite signal for the line (n) of interest, thereby extracting a luminance signal for the line (n) of interest.

10. The PAL signal demodulating apparatus according to claim 7, further comprising:
a line logical comb filter to extract the carrier color signal for the line (n) of interest from the BPF output signals for the line (n−2) preceding by two lines the line (n) of interest, for the line (n) of interest, and for the line (n+2) subsequent by two lines to the line (n) of interest; and
a frame logical comb filter to extract the carrier color signal for the frame (m) of interest from the BPF output signals for the frame (m−2) preceding by two frames the frame (m) of interest, for the frame (m) of interest, and for the frame (m+2) subsequent by two frames to the frame (m) of interest;
wherein the line carrier color signal extracting unit takes a weighted average of the carrier color signal for the line (n) of interest in the frame (m) of interest, extracted by the frame logical comb filter, and the carrier color signal for the line (n) of interest, extracted by the line logical comb filter, with such weights that the larger the motion detected by the motion detecting unit is, the larger the weight of the carrier color signal for the line (n) of interest extracted by the line logical comb filter, thereby producing an average carrier color signal for the line (n) of interest, and
wherein the carrier chrominance signal extracting unit takes the addition/subtraction of the average carrier color signal for the line (n) of interest produced by the line carrier color signal extracting unit and the average color phase distortion correcting color signal, thereby extracting carrier chrominance signals for the line (n) of interest.

11. The PAL signal demodulating apparatus according to claim 10, further comprising:
a luminance signal extracting unit to subtract the average carrier color signal from a composite signal for the line (n) of interest, thereby extracting a luminance signal for the line (n) of interest.

12. A PAL signal demodulating apparatus which demodulates a composite signal of a PAL (phase alternating line) system, comprising:
a frame carrier color signal extracting unit to extract a carrier color signal for a frame (m) of interest;
a 3D color phase distortion correcting color signal acquiring unit to generate a 3D color phase distortion correcting color signal for the frame (m) of interest using one or both of a frame (m−1) preceding the frame (m) of interest and a frame (m+1) following the frame (m) of interest;
a carrier chrominance signal extracting unit to take the addition/subtraction of the 3D color phase distortion correcting color signal and the carrier color signal extracted by the frame carrier color signal extracting unit, thereby extracting carrier chrominance signals for the frame (m) of interest,
the 3D color phase distortion correcting color signal acquiring unit configured to obtain an average of an inverted signal of the frame (m+1) and the frame (m−1), as the 3D color phase distortion correcting color signal for the frame (m) of interest;
a motion detecting unit to detect motion from the composite signal;
a 2D color phase distortion correcting color signal acquiring unit to obtain an average of an inverted signal of a line (n+1) following a line (n) of interest and a line (n−1) preceding the line (n) of interest, as a 2D color phase distortion correcting color signal for the line (n) of interest;
an average color phase distortion correcting color signal acquiring unit to take a weighted average of the 3D color phase distortion correcting color signal for the line (n) of interest in the frame (m) of interest and the 2D color phase distortion correcting color signal for the line (n) of interest with such weights that the larger the motion detected by the motion detecting unit is, the larger the weight of the 2D color phase distortion correcting color signal, thereby producing an average color phase distortion correcting color signal for the line (n) of interest; and a line carrier color signal extracting unit to extract a carrier color signal for the line (n) of interest, wherein the carrier chrominance signal extracting unit takes the addition/subtraction of the carrier color signal for the line (n) of interest extracted by the line carrier color signal extracting unit and the average color phase distortion correcting color signal, thereby extracting carrier chrominance signals for the line (n) of interest.

13. The PAL signal demodulating apparatus according to claim 12, wherein the frame carrier color signal extracting unit is a frame logical comb filter to extract the carrier color signal for the frame (m) of interest from the frame (m−2) preceding by two frames the frame (m) of interest, the frame (m) of interest, and the frame (m+2) subsequent by two frames to the frame (m) of interest.

14. The PAL signal demodulating apparatus according to claim 13, further comprising:

a luminance signal extracting unit to subtract the carrier color signal for the frame (m) of interest extracted by the frame logical comb filter from a composite signal for the frame (m) of interest, thereby extracting a luminance signal.

15. The PAL signal demodulating apparatus according to claim 12, further comprising:

a line logical comb filter to extract the carrier color signal for the line (n) of interest from a line (n−2) preceding by two lines the line (n) of interest, the line (n) of interest, and a line (n+2) subsequent by two lines to the line (n) of interest; and a frame logical comb filter to extract the carrier color signal for the frame (m) of interest from a frame (m−2) preceding by two frames the frame (m) of interest, the frame (m) of interest, and a frame (m+2) subsequent by two frames to the frame (m) of interest, wherein the line carrier color signal extracting unit takes a weighted average of the carrier color signal for the line (n) of interest in the frame (m) of interest, extracted by the frame logical comb filter, and the carrier color signal for the line (n) of interest, extracted by the line logical comb filter, with such weights that the larger the motion detected by the motion detecting unit is, the larger the weight of the carrier color signal for the line (n) of interest extracted by the line logical comb filter, thereby producing an average carrier color signal for the line (n) of interest, and wherein the carrier chrominance signal extracting unit takes the addition/subtraction of the average carrier color signal for the line (n) of interest extracted by the line carrier color signal extracting unit and the average color phase distortion correcting color signal, thereby extracting carrier chrominance signals for the line (n) of interest.

16. The PAL signal demodulating apparatus according to claim 15, further comprising:

a luminance signal extracting unit to subtract the average carrier color signal from a composite signal for the line (n) of interest, thereby extracting a luminance signal for the line (n) of interest.

* * * * *